US008335027B2

(12) United States Patent
Iida

(10) Patent No.: US 8,335,027 B2
(45) Date of Patent: Dec. 18, 2012

(54) METHOD, APPARATUS AND PROGRAM CALCULATING COLOR CONTROL VALUES FOR COLOR REPRODUCTION USING A COLOR PROFILE OF A PRINTING APPARATUS TO CALCULATE CHARACTERISTIC CHANGES IN BRIGHTNESS AND COLOR SATURATION CAUSED BY ADDING A BLACK PLATE TO COLOR PRINTING MATERIALS

(75) Inventor: Masaru Iida, Kawasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 465 days.

(21) Appl. No.: 12/703,690

(22) Filed: Feb. 10, 2010

(65) Prior Publication Data
US 2010/0214582 A1 Aug. 26, 2010

(30) Foreign Application Priority Data

Feb. 24, 2009 (JP) ................................ 2009-040236

(51) Int. Cl.
*H04N 1/60* (2006.01)
(52) U.S. Cl. ...................................... 358/520; 358/521
(58) Field of Classification Search .......... 358/518–523, 358/530; 382/167
See application file for complete search history.

(56) References Cited

U.S. PATENT DOCUMENTS

| 5,359,436 | A | * | 10/1994 | Dichter et al. | ................ | 358/520 |
| 6,104,891 | A | * | 8/2000 | Maebashi et al. | ............... | 399/53 |
| 6,377,366 | B1 | * | 4/2002 | Usami | .......................... | 358/520 |
| 6,466,332 | B1 | * | 10/2002 | Fukasawa | ..................... | 358/518 |
| 6,738,151 | B1 | * | 5/2004 | Kato | ............................. | 358/1.9 |

(Continued)

FOREIGN PATENT DOCUMENTS

JP 09-186894 7/1997

(Continued)

OTHER PUBLICATIONS

Japanese Notice of Reasons for Refusal issued by JPO on Nov. 30, 2010, in connection with Appl. No. 2009-040236, 2 pgs.

(Continued)

*Primary Examiner* — Scott A Rogers
(74) *Attorney, Agent, or Firm* — Squire Sanders (US) LLP

(57) ABSTRACT

A color reproduction meth a color printing apparatus which reproduces a color by a combination of a black plate and a plurality of chromatic color materials, which calculates color control values including a quantity of addition of the black plate to a first color reproduced by only a combination of the chromatic color materials to reproduce a second color which is reproduced by adding the black plate to the first color, includes: calculating, based on a color profile of the color printing apparatus, a characteristic data representing characteristic changes of a brightness and a color saturation of a representative color caused by adding the black plate to the representative color, wherein the representative color is reproduced by only any one of the chromatic color materials or a combination of the chromatic color materials; and calculating the color control value based on the characteristic data.

24 Claims, 8 Drawing Sheets

U.S. PATENT DOCUMENTS

| | | | |
|---|---|---|---|
| 6,806,979 B2 * | 10/2004 | Fukasawa | 358/518 |
| 7,227,666 B1 * | 6/2007 | MacLeod | 382/167 |
| 7,307,753 B2 * | 12/2007 | Sasaki et al. | 358/518 |
| 7,403,315 B2 * | 7/2008 | Tsuji et al. | 358/523 |
| 7,554,693 B2 * | 6/2009 | Okuoka et al. | 382/167 |
| 7,595,919 B2 * | 9/2009 | Tsuji | 358/518 |
| 7,633,658 B2 * | 12/2009 | Tsuji | 358/518 |
| 7,719,714 B2 * | 5/2010 | Tsuji | 382/167 |
| 8,014,024 B2 * | 9/2011 | Viturro et al. | 358/518 |

FOREIGN PATENT DOCUMENTS

| | | |
|---|---|---|
| JP | 2005-260777 | 9/2005 |
| JP | 2007-043250 | 2/2007 |

OTHER PUBLICATIONS

Translation of Japanese Notice of Reasons for Refusal issued by JPO on Nov. 30, 2010, in connection with Appl. No. 2009-040236, 2 pgs.

\* cited by examiner

| BLACK PLATE DENSITY | BRIGHTNESS (L*) | COLOR SATURATION (S) |
|---|---|---|
| 0 | 1.0000 | 1.0000 |
| 11% | 0.8714 | 0.8784 |
| 22% | 0.7623 | 0.7577 |
| 33% | 0.6611 | 0.6495 |
| 44% | 0.5795 | 0.5441 |
| 56% | 0.5144 | 0.4511 |
| 67% | 0.4484 | 0.3577 |
| 78% | 0.3507 | 0.2589 |
| 89% | 0.2117 | 0.1512 |
| 100% | 0.0000 | 0.0000 |

41

| Vk RANGE | RI RANGE | EQUATION |
|---|---|---|
| 0-11% | 1.0000-0.8784 | 0.1216 Rs -0.1286 Ri +0.0070 =0 |
| 11%-22% | 0.8784-0.7577 | 0.1206 Rs -0.1090 Ri -0.0094 =0 |
| 22%-33% | 0.7577-0.6495 | 0.1082 Rs -0.1013 Ri -0.0058 =0 |
| 33%-44% | 0.6495-0.5441 | 0.1054 Rs -0.0816 Ri -0.0167 =0 |
| 44%-56% | 0.5441-0.4511 | 0.0930 Rs -0.0650 Ri -0.0185 =0 |
| 56%-67% | 0.4511-0.3577 | 0.0935 Rs -0.0660 Ri -0.0183 =0 |
| 67%-78% | 0.3577-0.2589 | 0.0987 Rs -0.0977 Ri -0.0093 =0 |
| 78%-89% | 0.2589-0.1512 | 0.1078 Rs -0.1391 Ri -0.0018 =0 |
| 89%-100% | 0.1512-0.0000 | 0.1512 Rs -0.2117 Ri -0.0000 =0 |

METHOD, APPARATUS AND PROGRAM CALCULATING COLOR CONTROL VALUES FOR COLOR REPRODUCTION USING A COLOR PROFILE OF A PRINTING APPARATUS TO CALCULATE CHARACTERISTIC CHANGES IN BRIGHTNESS AND COLOR SATURATION CAUSED BY ADDING A BLACK PLATE TO COLOR PRINTING MATERIALS

CROSS REFERENCE TO RELATED APPLICATION

This application is based on Japanese Patent Application No. 2009-040236 filed on Feb. 24, 2009 in Japanese Patent Office, the entire content of which is hereby incorporated by reference.

BACKGROUND OF THE INVENTION

1. Field of Technology

The present invention relates to or reproduction methods, data processing apparatuses and programs.

2. Description of Related Art

Color printing apparatuses that reproduce color by the combination of an achromatic color material and a plurality of chromatic color materials and by their density adjustment have been known. As an example, one can give a CMYK method color printing apparatus that reproduces colors by superimposing chromatic toners of the colors cyan (C), magenta (M), yellow (Y) and a black (K) achromatic toner. In the following, explanations are given taking the example of a CMYK method color printing apparatus, and black (K) which is an achromatic toner is referred to as a black plate.

A color printing apparatus forms images on a printing medium (for example, paper, etc.) in accordance with the image data whose printing has been requested. At that time, if the image data is the same and the color printing apparatuses forming the image are different, very often the color reproduction of the image formed on the printing medium is different. In other words, in general, the color reproduction characteristic of printing vary depending on the individual color printing apparatus. Because of this, as a rule, in order to verify the color reproduction of a certain color printing apparatus, it is necessary to print using that color printing apparatus, and to verify that printed material.

On the other hand, there is a demand for carrying out printing using a small scale color printing apparatus before carrying out printing using a large scale of printing apparatus, to verify in advance the color reproduction at the time of printing. In view of this, there is a method of, based on the color control values corresponding to the color reproduction by a certain color printing apparatus (hereinafter referred to as a first color printing apparatus), calculating the color control values of a different color printing apparatus (hereinafter referred to as a second color printing apparatus) and simulating the color reproduction by a first printing apparatus using a second color printing apparatus (ink simulation). In other words, by calculating second color control values based on first color control values at the time of printing image data, and by printing that image data using a second color printing apparatus based on the calculated color control values, it is possible to simulate the color reproduction when that image data is printed using a first color printing apparatus.

As a concrete method of ink simulation there is profile color conversion of, based on the color profile of a first color printing apparatus and the color profile of a second color printing apparatus, converting first color control values into second color control values. In profile color conversion, a color profile (ICC file) is used whose specifications have been standardized by the International Color Consortium, (hereinafter referred to as ICC). The ICC profile has the color control values of a plurality of devices including various types of color printing apparatuses, and information indicating the correlative relationship with the profile connection space (hereinafter referred to as PCS) which has color values (CIE XYZ or CIE L*a*b*) in a three dimensional color space that does not depend on the different devices. Profile color conversion converts first color control values into color values in the PCS, and second color control values are calculated based on the color values after conversion.

However, as is shown in FIG. 12, in the color reproduction by a color printing apparatus of the CMYK method, when a black plate (K) is added to the color (hereinafter referred to as a first color) that is reproduced by the combination of the colors cyan (C), magenta (M), and yellow (Y), a second color is obtained that has lower brightness and color saturation than the first color The ratio of brightness and color saturation of the second color with respect to the first color is determined by the density of the black plate.

The density mentioned here indicates the quantity of toner per unit area, is controlled in the range from 0 to 100(%), and this quantity is determined by the color control values. The control of density by color control values is not limited to black plates but can be applied to the quantity of each toner and the color control values of color reproduction are expressed as CMYK=(a%, b%, c%, d%). Here, values in the range from 0 to 100 are used for each of the symbols a, b, c, and d, and indicate the quantity of each toner at the time of color reproduction of different colors. The increase or decrease of the brightness and color saturation due to the density of the black plate corresponds to the value of d.

The color reproduction of the second color by the superimposition of a black plate on a first color, apart from obtaining enhanced quality perception of color reproduction due to the addition of late, also causes visual effects such giving contrast variation to the printed image, etc. Therefore, expecting such visual effects, color reproduction of the second color is likely to be carried out by intentional use of a black plate. Therefore, in ink simulation, so that the effects due to the addition black plate during printing in the first color printing apparatus are not lost even during printing in the second color printing apparatus, addition of a black plate (black plate maintenance) is demanded at the time of printing in the second color printing apparatus.

On the other hand, as is shown in FIG. 13, the brightness reduction pattern due to a black plate may differ depending on the printing apparatus. In a similar manner, even the color saturation reduction pattern due to a black plate may also differ depending on the printing apparatus. Because of this, at the time of carrying out ink simulation, the black plate density may change, and as a result it may not be possible to carry out black plate maintenance. For example, when the second color control values are calculated by profile color conversion based on the color control values CMYK=(0%, 50%, 50%, 12%) including a black plate in a first color printing apparatus, there are situations when values will become CMYK=(5%, 56%, 56%, 0%) and the black plate Is lost, This is due to various reasons such differences In the color characteristic of the toners among the different color printing apparatuses, or when an achromatic color, that is black, is reproduced using color printing apparatus of the CMYK method, apart from the case reproducing black color using on black (K) color toner, can be reproduced using mixed colors by combining cyan (C), magenta (M), and yellow (Y).

In view of this, as a method of black plate maintenance, a method has been known of first determining the black plate density to be used in the second color printing apparatus, that is, in the printing apparatus on the output side, and of determining the appropriate CMY plate color control values based on that black plate density and the reproduction target color values in a three dimensional color space that is independent of the device (for example, see Japanese Unexamined Patent Application Publication No. H9-186894, and Japanese Unexamined Patent Application Publication No. 2007-43250).

However, there are cases in which it is not possible to use the black plate maintenance method described in Japanese Unexamined Patent Application Publication No. Hei 9-186894 and Japanese Unexamined Patent Application Publication No. 2007-43250 (hereinafter referred to as the conventional plate maintenance method).

When using the conventional black plate maintenance method, data will be necessary that gives the correlative relationship between the combination of the PCS color values for determining the color control values for a CMYK method color printing apparatus based on the PCS color values and the black plate control values for the second color printing apparatus and the black plate control values and the CMYK plate color control values. Since this correlative relationship is dependent on a specific ICC profile, even the data indicating this correlative relationship for each ICC profile will be different from each other.

Because of this, when using the conventional black plate maintenance method, it is necessary to restrict the ICC profiles used in the second color printing apparatus in order to prepare the data indicating the correlative relationship between the combination of PCS color values and black plate control value and the CMYK plate color control values.

On the other hand, in recent years, there are printing apparatuses in which the user can freely change the ICC profile such as the multifunction PostScript Printers, etc. In the case of a printing apparatus in which the ICC profile changed, if an ICC profile is used for the data indicating the correlative relationship between the combination of PCS color values and black plate control value and the CMYK color control values, is not possible to use the conventional black plate maintenance function.

The problem to be solved by the present invention is to provide a black plate maintenance function with far higher general purpose applicability.

SUMMARY OF THE INVENTION

To achieve at least one of the abovementioned objects, a color reproduction method reflecting one aspect of the present invention comprises a color reproduction method for a color printing apparatus which reproduces a color by combination of a black plate and a plurality of chromatic color materials, which calculates color control values including a quantity of addition of the black plate to a first color reproduced by only a combination of the chromatic color materials to reproduce a second color which is reproduced by adding the black plate to the first color, the color reproduction method comprising: calculating, based on a color profile of the color printing apparatus, a characteristic data representing characteristic changes brightness and a color saturation of a representative color caused by adding the black ate to the representative wherein the representative color is reproduced by only any one of the chromatic color materials or a combination of the chromatic color materials; and calculating the color control value based on the characteristic data.

In said color reproduction method, it is preferred that the representative color is a color reproduced by using only one chromatic color material of the plurality of chromatic color materials. Further, it is preferred that the chromatic color materials for the color printing apparatus include three colors of Cyan, Magenta, Yellow and the representative color may be Yellow, or the representative color is a color reproduced by using a maximum density of the only one chromatic color

DETAILED DESCRIPTION OF THE PREFERRED EMBODIMENTS

Examples of some preferred embodiments of the present invention are explained in detailed below with reference to the drawings.

Figure 1:
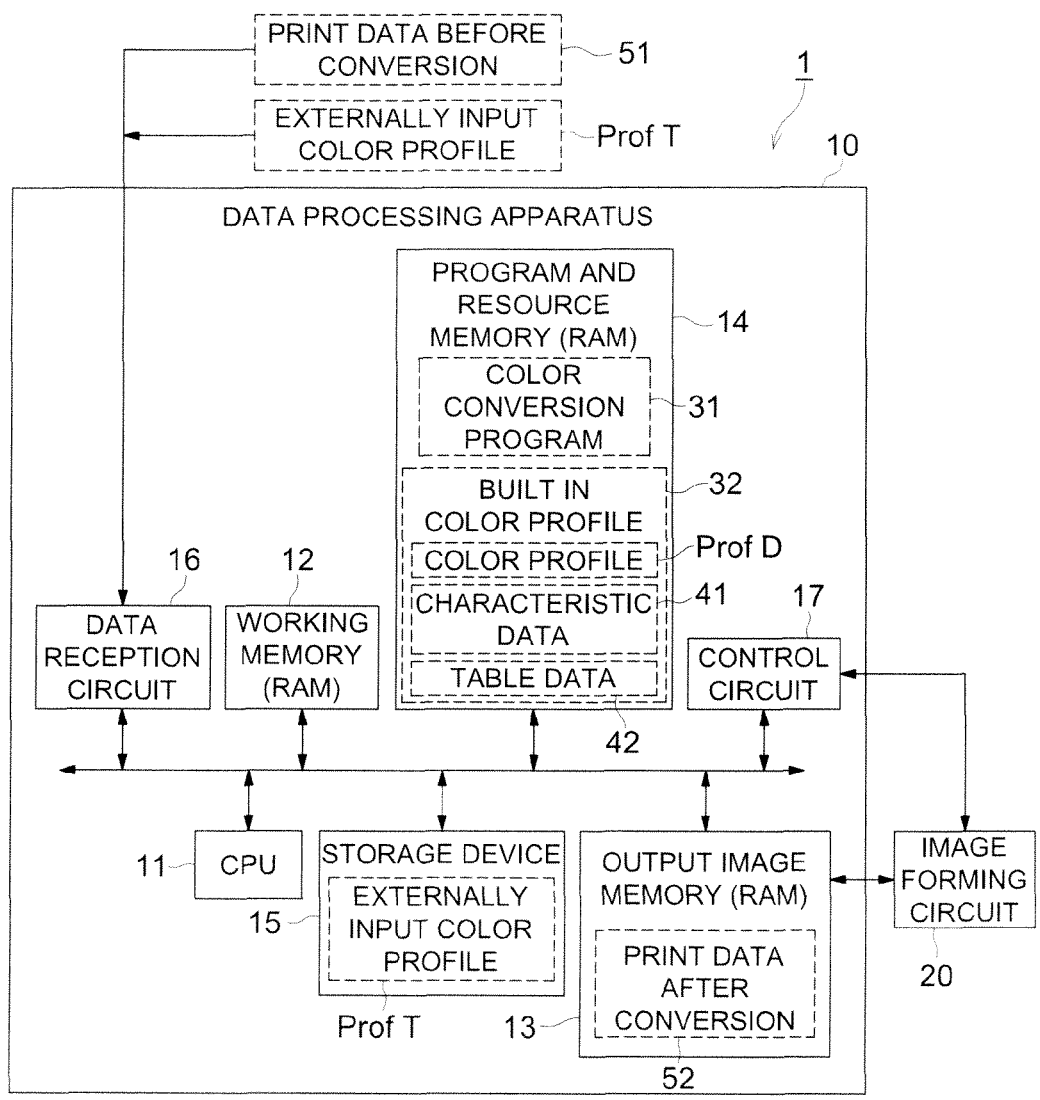
FIG. 1 is a block diagram showing the main configuration of a printing apparatus having a data processing apparatus according to a preferred embodiment of the present invention.

FIG. 1 is a block diagram showing the main configuration of a printing apparatus 1 having a data processing apparatus 10 according to one preferred embodiment of the present invention.

The printing apparatus 1 is provided with a data processing apparatus 10 and an image forming circuit 20. The data processing apparatus 10 is provided with a CPU 11, king memory 2, an output image memory 13, a prod resource memory storage device 15, a data reception circuit 16, a control circuit 17, and a bus 18 that interconnects of any these.

The CPU 11 carries out the different processes carried out by the data processing apparatus 10 and the operational control of the different sections of the printing apparatus 1 having the data processing apparatus 10. In concrete terms, it reads out from the program and resources memory 14 the programs, data, etc., according to the processing contents and executes them, carries out processing, and carries out operational control of the different parts based on the processing results.

The working memory 12 is a RAM (Random Access Memory) that stores the data etc., that are generated temporarily during the processing by the CPU 11.

The output image memory 13 is a RAM (Random Access Memory) for storing the print data output to the image forming circuit 20. The print data stored in the output image memory 13 is the print data (print data after conversion 52) after the ink simulation processing to be described later.

The program and resources memory 14 is a ROM (Read Only Memory) that stores the different types of programs, data, etc., that read out by the CPU 11. The program and resources memory 14 stores the color conversion program 31 and the built in profiles 32.

The color conversion program 31 is a program for carrying out the ink simulation processing and the different types of processes carried out during the ink simulation processing. The built in profile 32 is the data used during the ink simulation processing using the color conversion program 31.

The storage device 15 is a storage apparatus that can be re-writable, such as, for example, a hard disk drive, or a flash memory, etc.

The data reception circuit 16 receives the data input from an external device.

The control circuit 17 outputs the control signals that control the operations of the image forming circuit 20.

The image forming circuit 20, based on the control signals from the control circuit 17, reads out the print data stored in the output image memory 13 and outputs a video signal. The printing apparatus 1 has a print engine (not shown in the figure) that prints images on a printing medium such as paper, etc., based on the video signal, and the image forming circuit generates and outputs a video signal that can be interpreted by the print engine based on the print data which is based on the processing results of the processing apparatus 10. The print engine of the printing apparatus 1 carries out printing using the CMYK method. In other words, the printing apparatus 1 is a color printing apparatus of the CMYK method.

Next, an explanation is given about the built in color profile 32. The built in color profile 32, as a color profile of the printing apparatus 1, has characteristic data 41 indicating the change in the characteristic of the brightness and color saturation due to the addition of a black plate and due to the quantity of addition (density) of that black plate.

Figures 2, 3:
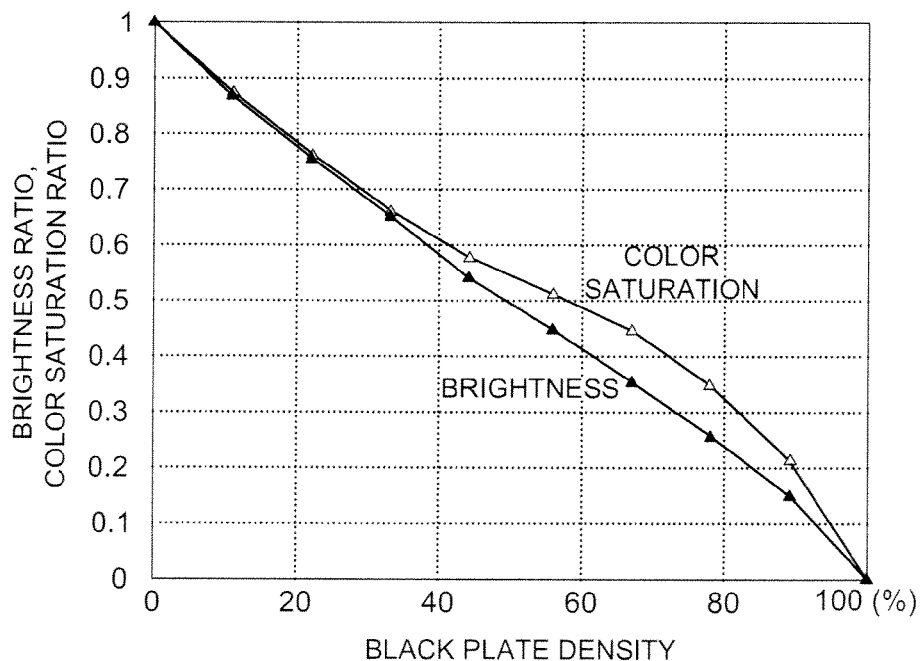
FIG. 2 is data, which is characteristic data present in the built in color profile, indicating the correlative relationship between the black density and the brightness ratio end color saturation ratio that change depending on the black density.
FIG. 3 is a graph showing the correlative relationship shown in FIG. 2.

FIG. 2 is the characteristic data 41, that is present in the built in color profile 32, and that indicates the correlative relationship between the black density and the brightness ratio and color saturation ratio that change depending on the black density. The brightness ratio and color saturation ratio in FIG. 2 are the brightness ratio and color saturation ratio relative to the brightness and color saturation of color due to a color control value of CMYK=(0, 0, 100, 0). In concrete terms, taking the brightness and color intensities as 1 of a color with the color control value being CMYK-(0, 0, 100, 0), that is, a black plate density of 0(%), and also, the densities of cyan and magenta both being 0(%) and the density of yellow being 100(%), and taking e brightness and color intensities as 0 of a color with the color control value being CMYK=(0, 0, 100, 100), that is, a black plate density of 100(%), and also, the densities of cyan and magenta both being 0(%) and the density of yellow being 100(%), these are the values of brightness ratio and color saturation ratio when only the black plate density is changed to the values of 0(%), 11(%), 22(%), 33(%), 44(%), 56(%), 67(%), 78(%), 89(%), and 100(%). FIG. 3 is a graph showing the correlative relationship shown in FIG. 2.

As is shown in FIG. 2, the built in color profile 32 has the characteristic data 41 related to the brightness and color saturation that change depending on the black plate density. The characteristic data 41 is the brightness ratio and color saturation ratio data calculated based on the color profile of the printing apparatus 1. The characteristic data 41 uses as the reproduction color only one typical chromatic color mat yellow (Y) with a density of 100%. in other words, the representative color is one that is represented by the color control value of CMY=(0, 0, 100) for the colors cyan (C), magenta (M), and yellow (Y).

Figures 4, 5:
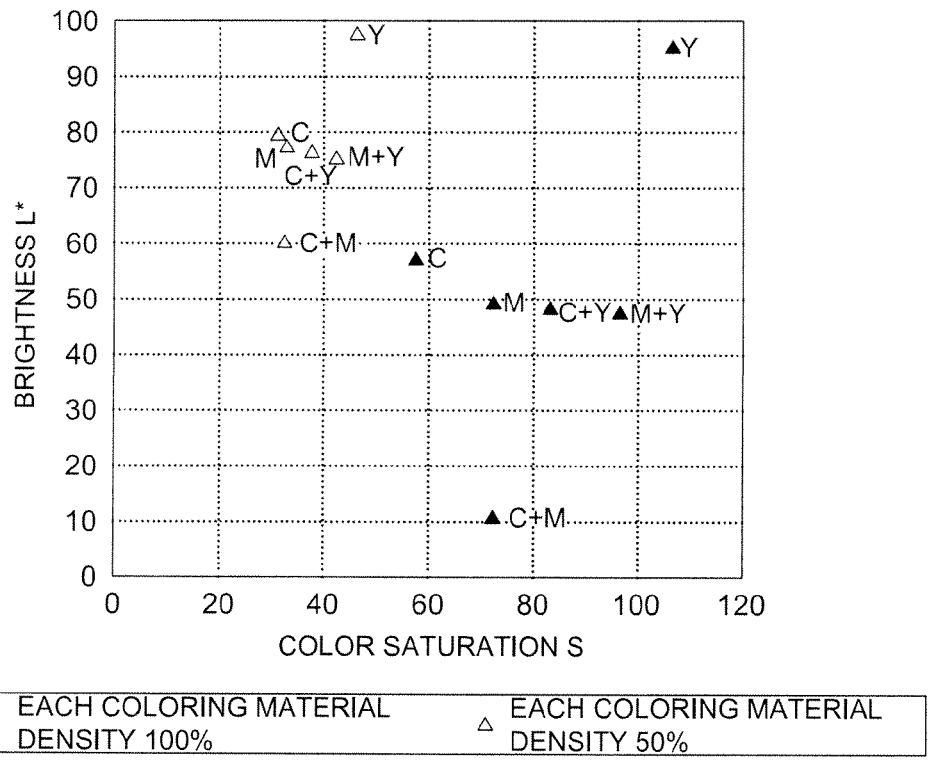
FIG. 4 is a planar distribution diagram showing an example of the brightness and color saturation of different reproduced colors by the individual colors of cyan (C), magenta (M), and yellow (Y) or combinations of any two of them.
FIG. 5 is table data 42 showing the correlative relationship between the brightness ratio and the color saturation ratio at the brightness ratios and color saturation ratios shown in FIG. 2.

FIG. 4 is a planar distribution diagram showing an example of the brightness and color saturation of different reproduced colors by the individual colors of cyan (C), magenta (M), and yellow (Y) or combinations of any two of them.

As is shown in FIG. 4, the color reproduced using only yellow (Y) with a density of 100% is positioned at the farthest point from the point (origin) at which the brightness and color saturation are both 0 as compared with other reproduced colors. In other words, the dynamic range of the colors that are reproduced using only yellow (Y) with a density of 100% is shown to be high compared to the other reproduced colors. The changes in the brightness and color saturation due to the addition of black plate can be verified more clearly when the dynamic range of the original color is high, that is, as the brightness and color saturation are both high. Because of this, in the present preferred embodiment, colors that are reproduced using only yellow (Y) with a density of 100% are used as the representative colors for calculating the brightness ratio and color saturation ratio of the characteristic data 41.

The graph shown in FIG. 3 shows the linear interpolations between the different brightness ratios and color saturation ratios at the different densities of the characteristic data 41 shown in FIG. 2.

FIG. 5 is table data 42 showing the correlative relationship between the brightness ratio and the color saturation ratio at the brightness ratios and color saturation ratios shown in FIG. 2.

Figure 6:
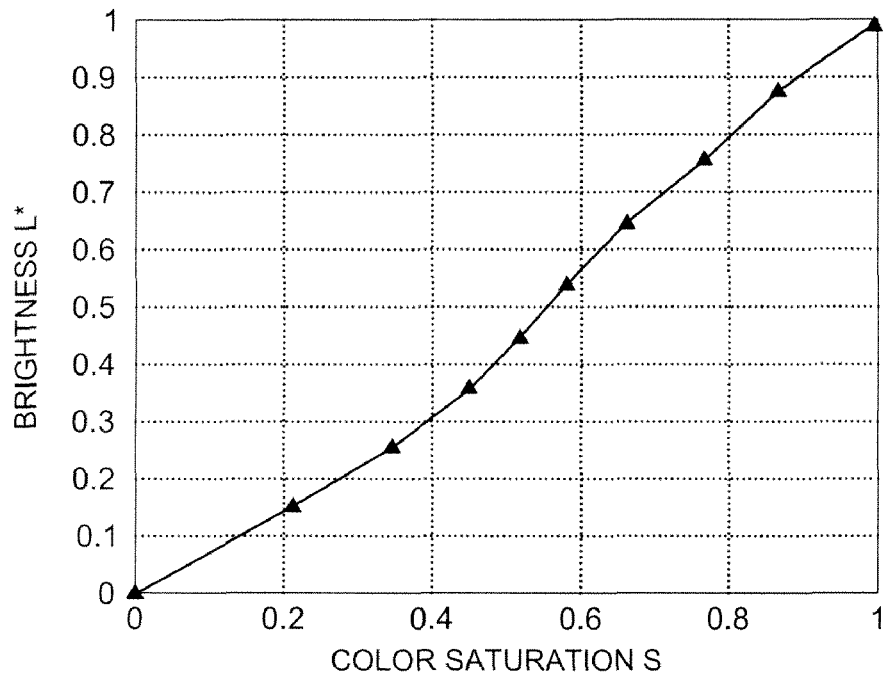
FIG. 6 is a graph of the correlative relationship indicated by the table data 42 of FIG. 5.

FIG. 6 is a graph of the correlative relationship indicated by the table data 42 of FIG. 5.

The correlative relationship between the brightness ratio and color saturation ratio at the brightness ratio (Rl Range shown in FIG. 5) between the respective different data gathering points (Vk Range shown in FIG. 5) present in the characteristic data 41, that is, between the respective data gathering points when the black plate density is 0(%), 11(%), 22(%), 33(%), 44(%), 56(%), 67(%), 78(%), 89(%), and 100 (%), is calculated by linear interpolation using the Equation shown in FIG. 5, thereby constructing the graph shown in FIG. 6.

The built in color profile 32 has, apart from the acteristic data 41, the color profile Pro for color reproduction using the printing apparatus 1. In the present preferred embodiment, the cha rustic data 41 shown in FIG. 2 and the table data 42 shown in FIG. 5 are the data obtained by calculations in advance based on the color profile ProfD.

Next, the ink simulation processing in the data processing apparatus 10 is explained below. The ink simulation carried out by the data processing apparatus 10 is one whose purpose is to simulate the color reproduction made in another printing apparatus (corresponding to a first printing apparatus) by the color reproduction in the printing apparatus 1 (corresponding to a second printing apparatus).

In the following, explanations are given according to the flow of ink simulation processing.

To begin with, via the data reception circuit 16, print data is input from an external device. At this time, even the externally input color profile ProfT is input at the same time. The externally input color profile ProfT is the color profile of another printing apparatus. In the following descriptions, in order to distinguish, that the print data input from an external device via the data reception circuit 16 is taken as the print data before conversion 51, and the print data stored in the output image memory due in simulation processing by the CPU 11 is taken as the data after conversion 52.

The print data before conversion 51 has in its contents the color control values PQRK1=(Pin, Qin, Rin, Kin) based on the externally input color profile ProfT. In other words, the target color of color reproduction due to ink simulation is the color that is obtained when the reproduced color of the color control value PQRK1=(Pin, Qin, Rin, Kin) based on the externally input color profile ProfT is printed in another printing apparatus.

When input on the print data is received before conversion 51 and the externally input color profile ProfT, the CPU 11 stores the externally input color profile ProfT in the storage device 15. Next, the CPU 11 reads out from the program and resources memory 14 the color conversion program 31 and the built in color profile 32 and carries out the ink simulation processing.

During ink simulation processing, the CPU 11 first carries out normal color profile conversion. In concrete terms, the CPU 11 generates the color control value CMYK1=(Co1, Mo1, Yo1, Ko1) from the color control value PQRK1 (Pin, Qin, Pin, Kin) of the data before conversion 51 based on the externally input color ProfT and the color profile ProfD. The color control value CMYK1=(Co1, Mo1, Yo1, Ko1) is the color control value with the purpose of reproducing in the printing apparatus 1 the color when the color control value PQRK1=(Pin, Qin, Rin, Kin) of the print data before conversion 51 is printed in another printing apparatus. Since the normal color profile conversion is a widely known technology, its details will be omitted here.

Next, the CPU 11 judges whether or not Kin>0 of the black plate density Kin of the color control value PQRK1=(Pin, Qin, Rin, Kin) of the print data before conversion 51 and judges whether or not Ko1=0 for the black plate density Ko1 of the color control value CMYK1=(Co1, Mo1, Yo1, Ko1). If Kin is >0 and also Ko1 is not equal to 0, it is judged that the black plate has been maintained, and the CPU 11 returns the color control value CMYK1=(Co1, Mo1, Yo1, Ko1) as the result of conversion, that is, as the reproduced color, of the color control value PQRK1=(Pin, Qin, Rin, Kin) of the print data before conversion 51. If Kin is >0 and also Ko1 is equal to 0, it is judged that the black plate has not been maintained, and the CPU 11 carries out color profile conversion for black plate maintenance.

Next, the color profile conversion for black plate maintenance is explained in accordance with the flow.

To begin with, the CPU 11 generates the color control value PQRK2=(Pin, Qin, Rin, 0) by replacing the black plate density Kin by 0 in the color control value PQRK1=(Pin, Qin, Rin, Kin) of the print data before conversion 51. Next, the CPU 11 generates the color control value CMYK2=(Co2, Mo2, Yo2, Ko2) from the color control value PQRK2=(Pin, Qin, Rin, 0) by carrying out normal color profile conversion based on the externally input color profile ProfT and the color profile ProfD.

Next, the CPU 11 generates the color control value CMYK3=(Co2, Mo2, Yo2, 0) by replacing the black plate density Ko2 by 0 in the color control value CMYK2=(Co2, Mo2, Yo2, Ko2). Next, the CPU 11 generates the PCS color value L*b*2=(Lo2, Ao2, Bo2) from the color control value CMYK3=(Co2, Mo2, Yo2, 0) by carrying out normal color profile conversion based on the color profile ProfD.

Next, the CPU 11 calculates the color saturation So2 of the PCS color value L*a*b*2=(Lo2, Ao2, Bo2). At this time, the calculation of the color saturation So and the color saturation So2 is done based on the following Equation (1).

$$S = \text{SQRT}(A^2 + B^2) \quad (1)$$

Here, Equation (1) indicates that the color saturation S is calculated using the SQRT function base the color value A and the color value B constituting the PCS color value (L, A, B).

Next, the CPU 11 generates the PCS color value L*a*b*1=(Lo1, Ao1, Bo1) from the color control value CMYK1=(Co1, Mo1, Yo1, Ko1) by carrying out normal color profile conversion based on the color profile ProfD. Next, the CPU 11 calculates the color saturation So1 of the PCS color value L*a*b*1=(Lo1, Ao1, Bo1) based on Equation (1).

Next, the CPU 11 calculates the black plate density Kp to be added to the color control value CMYK3=(Co3, Mo3, Yo3, 0) based on the brightness values Lo1, Lo2, on the color saturation values So1, So2, and based on the characteristic data 41. The black plate density Kp is the optimum black plate density so as to reproduce the color due to the color control value PQRK1=(Pin, Qin, Rin, Kin) of the print data before conversion 51 by adding black plate to the color control value CMYK3=(Co3, Mo3, Yo3, 0).

In the following, the details of the process for calculating the black plate density Kp are explained.

To begin with, the CPU 11 calculates the brightness ratio and the color saturation ratio for the brightness and color saturation (Lo2, So2) of the PCS color value L*a*b*2=(Lo2, Ao2, Bo2) corresponding to the brightness and color saturation (Lo1, So1) of the PCS color value L*a*b*=(Lo1, Ao1, Bo1). In the following, the ratio of the brightness Lo2 relative to the brightness Lo1 is denoted by Rl, the ratio of the color saturation S02 relative to the color saturation S01 is denoted by Rs, and the point indicating this brightness ratio and this color saturation ratio is denoted by the point P0 (Rs, Rl).

Next, the CPU 11 obtains the point P1 that has the closest approximation of the brightness ratio and color saturation ratio to the point P0 (Rs, Rl) in the graph shown in FIG. 6, that is, in the correlative relationship between brightness ratio and color saturation ratio of the characteristic data 41 shown in FIG. 5.

As the process for obtaining the point P1, to begin with, the CPU 11 selects and obtains the data gathering point P (N) that is the closest approximation to the point P0 (Rs, Rl) among the correlative relationships between the brightness ratio and the color saturation ratio at the data gathering points corresponding to the different black plate densities of the characteristic data 41 shown in FIG. 2.

Next, the CPU 11 obtains an equation showing two interpolation straight lines having one of their ends as the data gathering point P (N) the interpolation straight lines, that is, the two interpolation straight lines, one between P (N−1) and P (N) and another between P (N) and P (N+1). Next, for each of the two interpolation straight lines, the points of intersection Pq (Rsq, Rlq) are obtained with straight lines that pass through the point P0 (Rs, Rl) and that are at right angles to these two straight lines, respectively.

The line perpendicular to the straight line ax+by+c=0 passing through the point (x0, y0) is obtained by the following Equation (2).

$$bx-ay+(ay0-bx0)=0. \quad (2)$$

Next, the value of xc of the intersection point Pc (xc, yc) is obtained by the following Equation (3) and the value of yc is obtained by the following Equation (4) for the point of intersection between the straight line a1x+b1y+c1=0 and the straight line a2x+b2y+c2=0.

$$xc=b1c2-b2c1/a1b2-a2b1. \quad (3)$$

$$yc=a2c1-a1c2/a1b2-a2b1. \quad (4)$$

The CPU 11 takes the point P0 (Rs, Rl) as the point (x0, y0) of Equation (2), takes an interpolation straight line whose one end is the data gathering pint P (N) as the straight line ax+by+c=0 of Equation (3) and obtains the equation for the perpendicular line that passes through the point P0 (Rs, Rl) and intersects with the line indicated in the graph FIG. 6, and obtains the point of intersection Pq (Rsq, Rlg) by using Equation (4) to in the point of intersection between that perpendicular line and the interpolation straight line that has the data gathering point (N) as its one end.

In the following, for the sake of convenience, the point of intersection with the line that is perpendicular to the interpolation straight line between P (N−1) and P (N) is taken as the point of intersection Pq1 (Rsq1, Rlq1), and the point of intersection with the line that is perpendicular to the interpolation straight line between P (N) and P (N+1) is taken as the point of intersection Pq2 (Rsq2, Rlq2).

The CPU 11, regarding Rlq1 of the point of intersection Pq1 (Rsq1, Rlq1), judges whether or not it is within the range for the segment between P (N−1) and P (N) indicated in FIG. 5 as the Rl Range.

Figure 7:
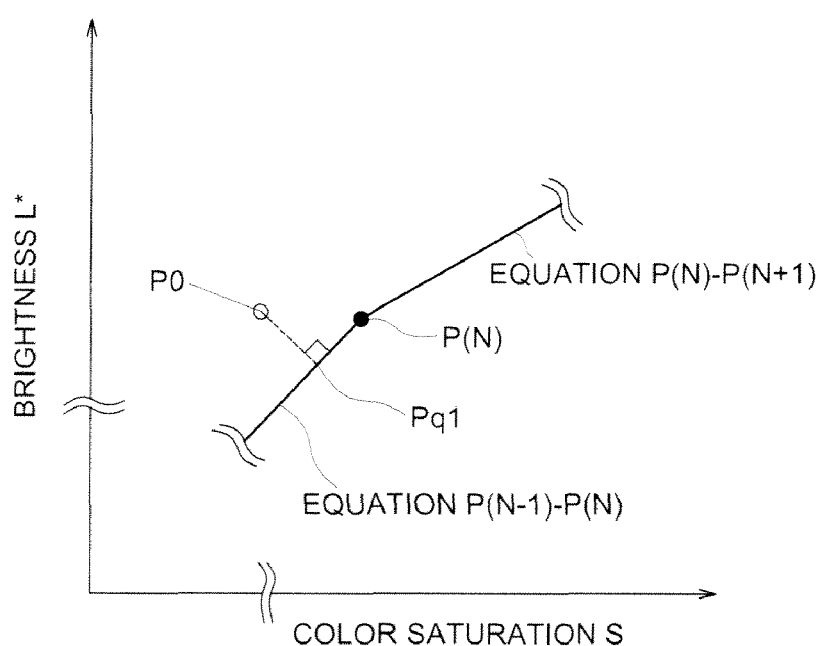
FIG. 7 is an explanatory diagram showing one example in which Rlq1 is within the range of the Rl Range.

FIG. 7 is an explanatory diagram showing an example when Rlq1 is within the range of the Rl Range.

When Rlq1 is within the range of the Rl Range, as is shown in FIG. 7, Pq1 (Rsq1, Rlq1) is positioned in the continuous line part the interpolation straight line in the graph shown in FIG. 6.

Figure 8:
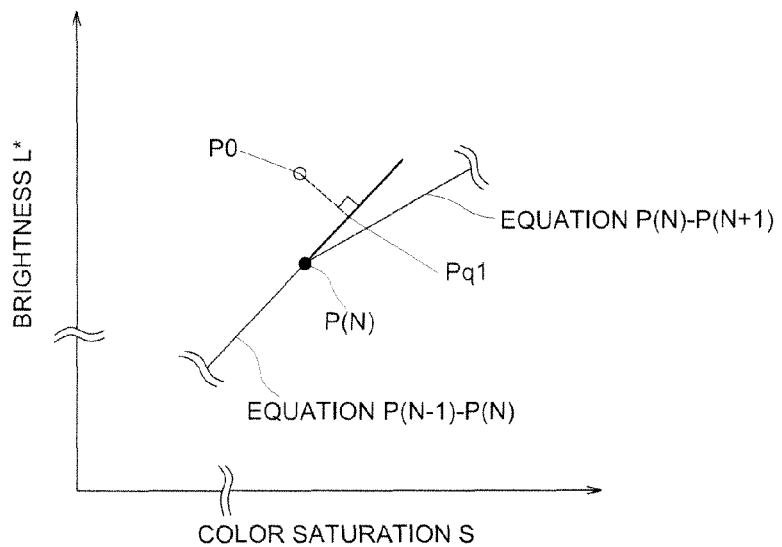
FIG. 8 is an explanatory diagram showing one example in which Rlq1 is not within the range of the Rl Range.

FIG. 8 is an explanatory diagram showing an example when Rlq1 is not within the range of the Rl Range.

When Rlq1 is within the range of the Rl Range, as is shown in FIG. 8, Pq1 (Rsq1, Rlq1) is positioned not in continuous line part of the interpolation straight line in the graph shown in FIG. 6, but is on the extension part of the interpolation straight line between P (N−1) and P (N) thereby indicating that the brightness ratio is not one that is obtained from the characteristic data 41.

In a similar manner, the CPU 11, regarding Rlq of the point of intersection Pq2 (Rsq2, Rlq2), judges whether or not it is within the range for the segment between P (N) and P (N+1) indicated in FIG. 5 as the Rl Range.

When Rlg1 of the intersection point Pq1 (Rsq1, Rlq1) and Rlq2 of the intersection point Pq2 (Rsq2, Rlq2) are both within the range of the Rl Range, respectively, the CPU 11 obtains as the point P1 one of the two intersection points Pq1 (Rsq1, Rlq1) and Pq2 (Rsq2, Rlq2) whichever is closer to the point P1 (Rs, Rl). If only one of the two intersection points Pq1 (Rsq1, Rlg2 ) and Pq2 (Rsq2, Rlq2) is within its Rl Range, the CPU 11 obtains the intersection point that is within the Rl range as the point P1. When Rlq1 of the intersection point Pq1 (Rsq1, Rlq1) and Rlq2 of the intersection point Pq2 (Rsq2, Rlq2) are both in the ran of the Rl Range, respectively, the CPU 11 obtains the data gathering point P (N) as the point P1.

Figure 9:
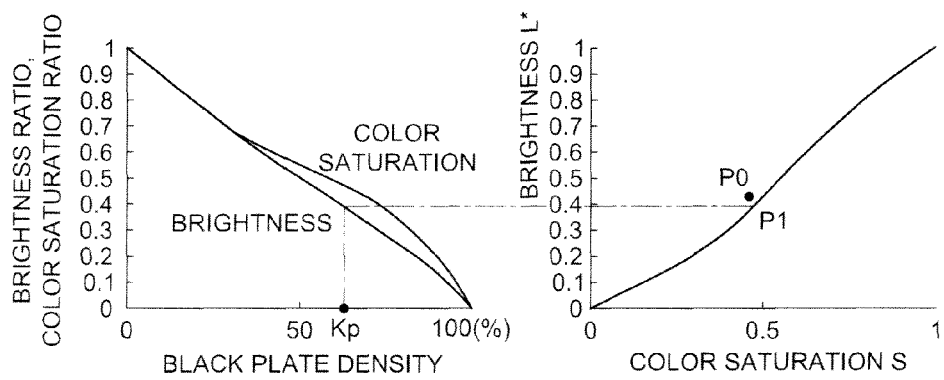
FIG. 9 is an explanatory diagram of the process of obtaining the black plate density Kp based on the point P1.

FIG. 9 is an explanatory diagram for the process of obtaining the black plate density Kp based on the point P1.

The CPU 11 calculates the black plate density corresponding to the brightness ratio of point P1 based on the Rl Range and Vk Range of the table data 42 and based on the Equation shown in FIG. 5, and obtains that result of calculation as the black plate density Kp. The black plate density Kp is obtained according to the above processing.

Further, the CPU 11 returns the color control value CMYK4=(Co2, Mo2, Yo2, Kp) based on the different density values Co2, Mo2, and Yo2 for the colors cyan (C), magenta (M), and yellow (Y) of the color control value CMKY2 and the black plate density Kp as the result of converting the color control value PQRK1=(Pin, Qin, Rin, Kin) of the print data before conversion 51, that is, as the reproduced color.

Further, the CPU 11, stores the print data (print data after conversion 52) according to the obtained reproduced color in the output image memory 13.

Figure 10:
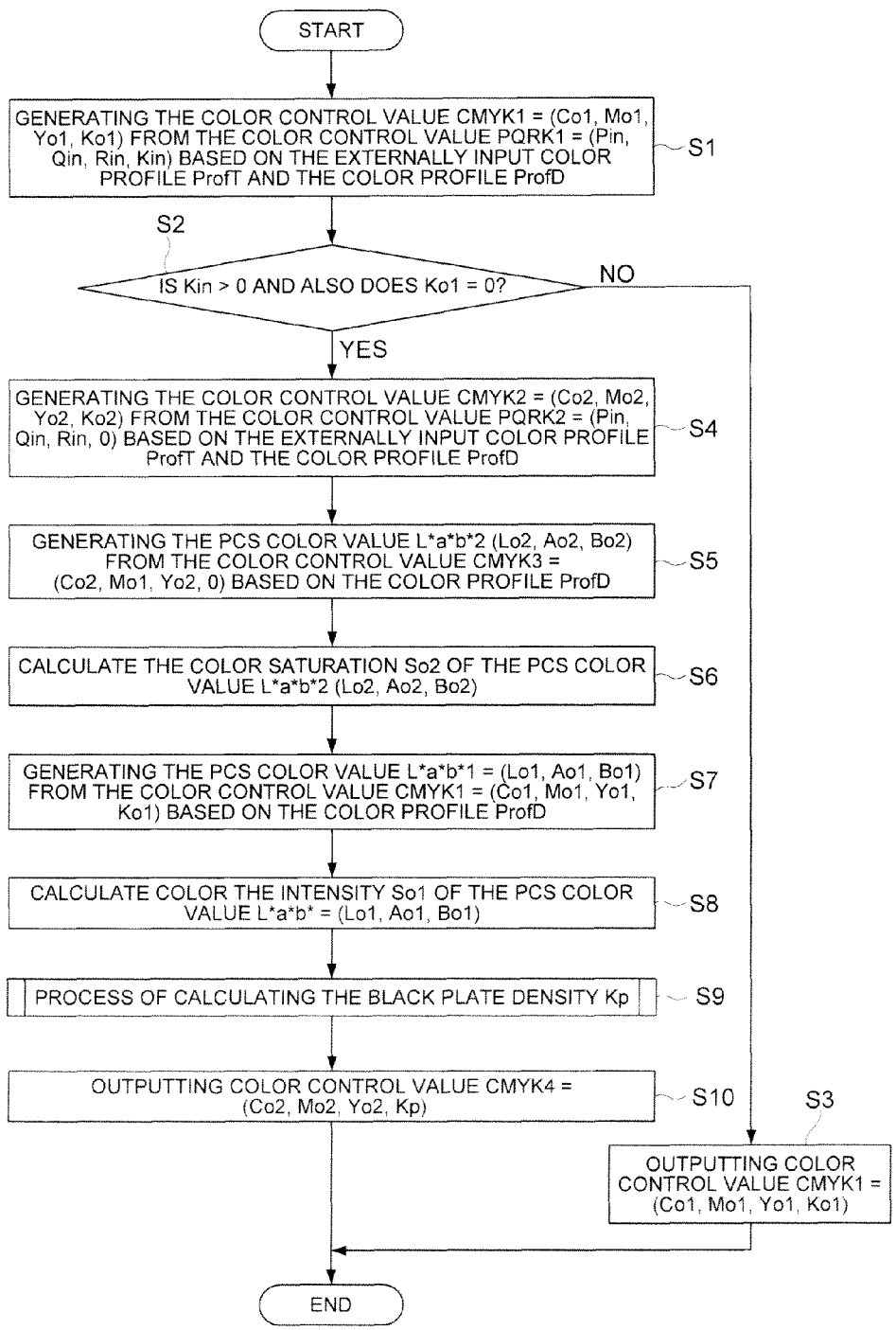
FIG. 10 is a flow chart showing the overall flow of the ink simulation process.
Figure 11:
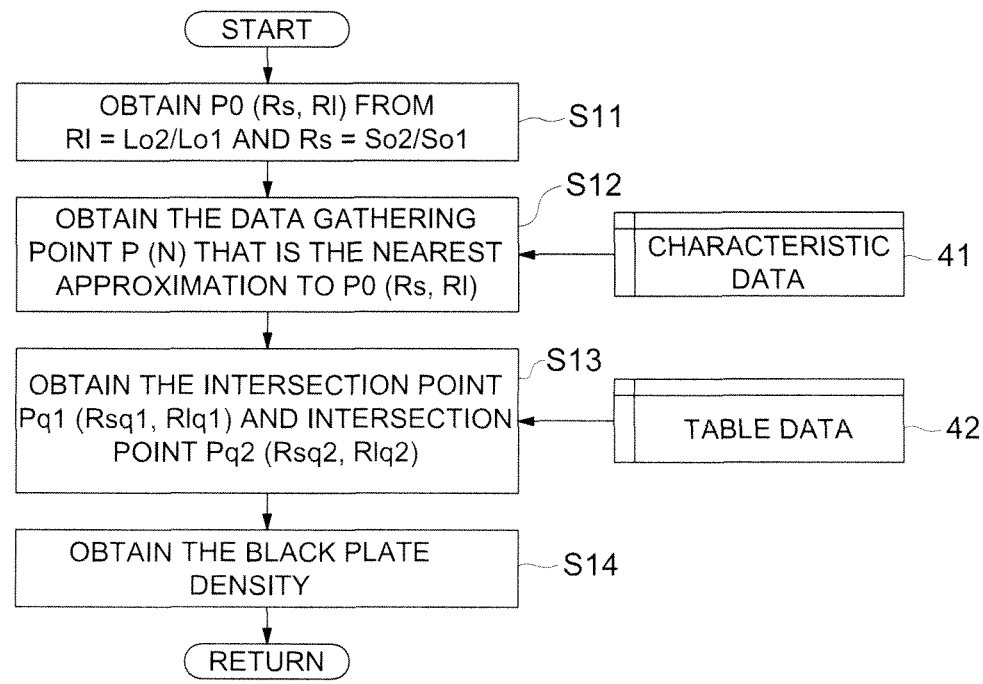
FIG. 11 is a sub-flow showing the flow of the calculation process of the black plate density Kp.
Figure 12:
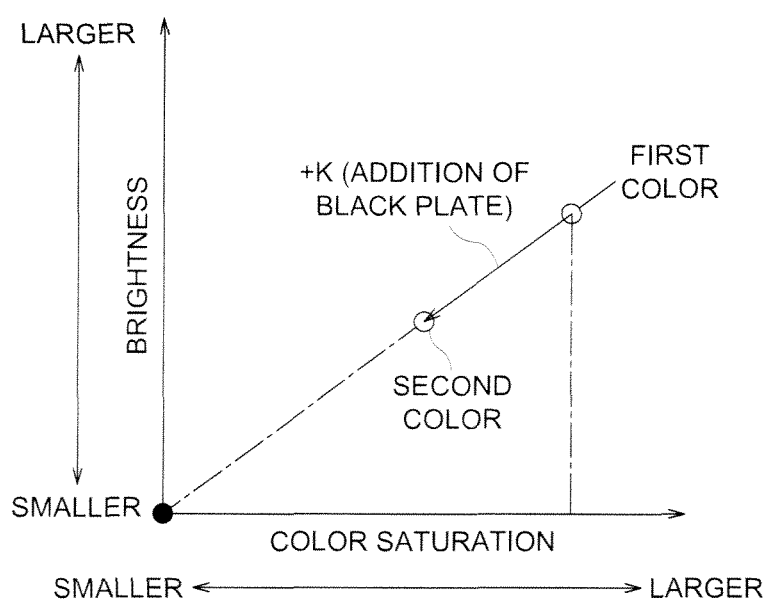
FIG. 12 is a graph showing one example of the reduction in the brightness and the color saturation of the reproduced color due to the addition of a black plate (K).
Figure 13:
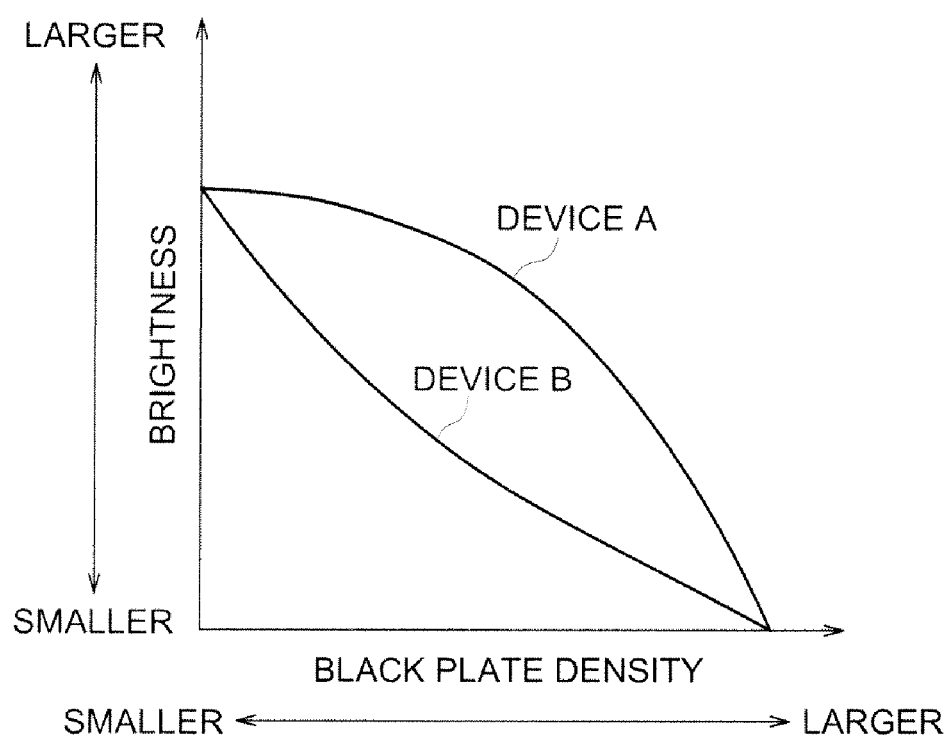
FIG. 13 is a graph showing an example of the correlative relationship between the black plate density and the brightness in two different printing apparatuses (Device A and Device B).

Next, the flow of the ink simulation processing of the data processing apparatus 10 is explained based flow charts or FIG. 10 and FIG. 11.

FIG. 10 is a flow chart showing the overall flow of the ink simulation processing.

The CPU 11 generates the color control value CMYK1=(Co1, Mo1, Yo1, Ko1) from the color control value PQRK1=(Pin, Qin, Rin, Kin) of the print data before conversion 51 based on the externally input color profile ProfT and the color profile ProfD by carrying out normal color profile conversion (Step S1). Next, the CPU 11 judges whether or not Kin>0 and also whether or not Ko1=0 (Step S2).

In Step S2, if Kin is >0 and also Ko1 is not equal to 0 (NO in Step S2), the CPU 11 outputs the color control value CMYK1=(Co1, Mo1, Yo1, Ko1) as the reproduced color (Step S3), and ends the processing.

In Step S2, if Kin is >0 and also if Ko1 is equal to 0 (YES in Step S2), the CPU 11 generates the color control value CMYK2=(Co2, Mo2, Yo2, Ko2) from the color control value PQRK2=(Pin, Qin, Rin, 0) by carrying out normal color profile conversion based on the externally input color profile ProfT and the color profile ProfD (Step S4). Next, the CPU 11 generates the PCS color value L*a*b*2=(Lo2, Ao2, B from he color control value CMYK3=(Co2, Mo2, Yo2, 0) by carrying out normal color profile conversion based on the color profile ProfD (Step S5) Next, the CPU 11 calculates the color saturation So2 of the PCS color value L*a*b*2=(Lo2, Ao2, Bo2) based on Equation (1) (Step S6).

Further, the CPU 11 generates the PCS color value L*a*b*1=(Lo1, Ao1, Bo1) from the color control value CMYK1=(Co1, Mo1, Yo1, Ko1) obtained in Step 1 by carrying out normal color profile conversion based on the color profile ProfD (Step S7). Next, the CPU 11 calculates the color saturation So1 of the PCS color value L*a*b*1=(Lo1, Ao1, Bo1) based on Equation (1) (Step S8).

Next, the CPU 11 carries out the calculation of the black plate density Kp based on the brightness values Lo1, Lo2, on the color saturation values So1, So2, and based on the characteristic data 41 (Step S9). Based on the black plate density Kp obtained in Step S9, the CPU 11 outputs the color control value CMYK4=(Co2, Mo2, Yo2, Kp) as the reproduced color (Step S10), and ends the processing.

However, the processes from Steps S4 to S6 and in Steps S7 to S8 can be carried out in parallel, and the order of their processing can be interchanged, or they can be processed at the same time.

Next, the method of calculating the black plate density Kp indicated in Step S9 is explained below.

FIG. 11 sub flow showing the flow of the process of calculating the black plate den Kp.

To begin with, the CPU 11 not only calculates, based on the brightness Lo1 obtained in Step S7, on the brightness Lo2 obtained in Step S5, the brightness ratio Rl of the brightness Lo2 relative to the brightness Lo1, but also calculates, based on the color saturation So1 obtained in Step S8 and the color saturation So2 obtained in Step S6, the color saturation ratio Rs of the color saturation So2 relative to the color saturation So1, and obtains P0 (Rs, Rl) (Step S11). Next, the CPU 11, based on the correlative relationship between the brightness ratio and color saturation ratio indicated by the characteristic data 41 shown in FIG. 2, obtains the data gathering point P (N) that is the closest approximation to the point P0 (Rs, Rl) indicating the brightness ratio and color saturation ratio obtained in Step S11 in that correlative relationship (Step S12). In addition, the CPU 11, based on the interpolation straight line Equation between the data gathering points shown in FIG. 5, obtains the equations indicating two interpolation straight lines having one of their ends as the data gathering point P (N), that is, the two interpolation straight lines between P (N−1) and P (N) and between P (N) and P (N+1), and obtains the intersection point Pg1 (Rsq1, Rlg1) and the intersection point Pq2 (Rsq2, Rlq2) which are, respectively, the points of intersection between those interpolation straight lines and a line perpendicular to that interpolation straight line and also passes through the point P0 (Rs, Rl) (Step S13). Next, the CPU 11 obtains the point P1 based on the judgment result as to whether Rlg1 and Rlq2 are within the range of the Rl Range, and obtains the black plate density Kp corresponding to the brightness ratio and color saturation ratio at the point P1 based on the Rl Range, Vk Range, and Equation shown in the table data 42 of FIG. 5 (Step S14).

Although the above was a description related to the ink simulation processing carried out based on the print data before conversion 51 by another printing apparatus, the black plate control according to the present preferred embodiment can also be applied to other usages. For example, when outputting in a printing apparatus 1 the reproduced colors being displayed in the display device of a computer, this preferred embodiment can also be applied in cases such as when carrying out black plate control by inputting the reproduced color being displayed from a data reception circuit 16.

According to the present preferred embodiment, the characteristic data 41 indicating the change in characteristic of the brightness and color saturation of a representative color due to the addition of a black plate with respect to a representative color (color represented by the color control values CMY=(0, 0, 100)) is calculated in advance based on the color profile of a printing apparatus 1, and the black plate density Kp is calculated based on the characteristic data 41. In other words, since the characteristic data 41 for calculating the black plate density Kp for maintaining the black plate can be calculated based on the color profile ProfD of the printing apparatus 1, there is no limitation as in the conventional black plate maintenance method of restricting the ICC profile for maintaining the black plate. Because of this, it is possible to offer a black plate maintenance method with far higher general purpose applicability such as being possible to carry out black plate maintenance even in a printing apparatus in which the user can freely change the ICC profile.

In addition, a reproduced color that is based only on the color yellow (Y) which is one of the chromatic coloring materials is used as the representative color compared the case of using a combination of a plurality of coloring materials as the representative color of the reproduced colors, it is possible to calculate characteristic data 41 having a color for which the brightness and color saturation are stable as the representative color, it is possible to carry out black plate density control based on stable changes in the brightness ratio and color saturation ratio with extremely small errors between different color printing apparatuses when the same characteristic data 41 is copied among color printing apparatuses of the same type.

In addition, since the printing apparatus 1 uses chromatic color materials of cyan (C), magenta (M), and yellow (Y), and since only the chromatic color material of the color yellow (Y) is used as the representative color for determining the reproduced color, it is possible to acquire a large dynamic range of the representative color compared to other representative colors, and it is possible to calculate characteristic data 41 that more clearly indicates the changes in the brightness ratio and the color saturation ratio according to the black plate density.

In addition, since as the representative color only the chromatic coloring material yellow (Y) with 100% density is used for the reproduction color, it is possible to acquire a large dynamic range of the representative color compared to other representative colors, and it is possible to calculate characteristic data 41 that more clearly indicates the changes in the brightness ratio and the color saturation ratio according to the black plate density.

Further, the preferred embodiment of the present invention disclosed here is merely an example in all aspects and shall not be construed in any manner to restrict the present invention. The scope of the present invention is not indicated by the above descriptions but by the scope of the claims, and it is intended that all modifications within the equivalent scope and meaning of the claims shall be construed to be part of the present invention.

For example, the data processing apparatus 10 in the present preferred embodiment is merely one configuration of a printing apparatus 1, it is also possible to provide it as a data processing apparatus that is separate from the printing apparatus. For example, a computer such as a PC, etc., can also be made to function as a data processing apparatus.

In the present preferred embodiment, although only the maximum density (100%) oi. the color yellow (Y) has been made a representative color of the reproduced colors in a printing apparatus of the CMYK method, it is not necessary to restrict the color to yellow (Y) and it is possible to use as a representative color of the reproduced colors any other single chromatic coloring material only or to use a combination of a plurality of chromatic coloring materials, or it is possible to freely set the density of the chromatic coloring materials used as the representative color.

The present invention shall not be restricted to printing apparatuses of the CMYK method, and it is also possible to apply the present invention to printing apparatuses using other chromatic coloring materials. For example, the printing apparatus can be a printing apparatus using three chromatic coloring materials other than CMYK (for example, the RGB method), or can be a printing apparatus using four or more colors or two or less colors.

The number of gathering points of the black plate density or the black plate densities of each data gathering point that become the data gathering points for the characteristic data indicated in the present preferred embodiment, and other different types of data or numerical values are mere examples, and shall not e construed to be restricting the present invention. For example, the characteristic data my have more than 10 or less than 8 data gathering points, or an interpolation using any method other than linear interpolation can be used (for example, the homothetic curve, etc.) for the interpolation between the different data gathering points.

In the above descriptions, although an example was disclosed in which a medium for programs according to the present invention that is computer readable is a ROM, it is not necessary to be restricted to this example. As other computer readable media, it is possible to use nonvolatile memory such as flash memory, or to use portable recording media such as a CD-ROM, etc. Further, even carrier wave is applicable as a medium for providing the data of the programs related to the present invention.

What is claimed is:

1. A color reproduction method for a color printing apparatus which reproduces a color by a combination of a black plate and a plurality of chromatic color materials, which calculates color control values including a quantity of addition of the black plate to a first color reproduced by only a combination of the chromatic color materials to reproduce a second color which is reproduced by adding the black plate to the first color, the color reproduction method comprising:
    calculating, based on a color profile of the color printing apparatus, a characteristic data representing characteristic changes of a brightness and a color saturation of a representative color caused by adding the black plate to the representative color, wherein the representative color is reproduced by only any one of the chromatic color materials or a combination of the chromatic color materials; and
    calculating the color control value based on the characteristic data.

2. The color reproduction method of claim 1, wherein the representative color is a color reproduced by using only one chromatic color material of the plurality of chromatic color materials.

3. The color reproduction method of claim 2, wherein the chromatic color materials for the color printing apparatus include three colors of Cyan, Magenta, Yellow and the representative color is Yellow.

4. The color reproduction method of claim 2, wherein the representative color is a color reproduced by using a maximum density of the only one chromatic color.

5. A color reproduction method which calculates a second color control value which corresponds to a color reproduction of a second color printing apparatus which reproduces a color by a combination of a black plate and a plurality of chromatic color materials, based on a color profile of a first color printing apparatus which reproduces a color by a combination of a black plate and a plurality of chromatic color materials, a color profile of the second color printing apparatus, and a first color control value which corresponds to a color reproduction of the first color printing apparatus, in order to reproduce, at the second color printing apparatus, color which is reproduced at the first color printing apparatus, the color reproduction method comprising:
    calculating, based on the color profile of the second color printing apparatus, a characteristic a representing characteristic changes brightness and a color saturation a representative color caused by adding the black plate used at the second color printing apparatus, to the representative color which is reproduced by only any one of the chromatic color materials or a combination of the chromatic color materials used at the second color printing apparatus; and
    calculating the second color control value based on the characteristic data.

6. The color reproduction method of claim 5, wherein the representative color is a color reproduced by using only one chromatic color material of the plurality of chromatic color materials.

7. The color reproduction method of claim 5, wherein the chromatic color materials for the color printing apparatus include three colors of Cyan, Magenta, Yellow and the representative color is Yellow.

8. The color reproduction method of claim 5, wherein the representative color is a color reproduced by using a maximum density of the only one chromatic color.

9. A data processing apparatus which calculates color control values including a quantity of addition of a black plate to a first color reproduced by only a combination plurality of chromatic color materials reproduced a second color which is reproduced by adding the black plate to the first color of a color printing apparatus which reproduces a color by a combination of the black plate and the plurality of chromatic color materials, the data processing apparatus comprising a controller which calculates, based on a color profile of the color printing apparatus, a characteristic data representing characteristic changes of a brightness and a color saturation of a representative color caused by adding the black plate to the representative color, wherein the representative color is reproduced by only any one of the chromatic color materials or a combination of the chromatic color materials and calculates the color control value based on the characteristic data.

10. The data processing apparatus of claim 9, wherein the representative color is a color reproduced by using only one chromatic color material of the plurality of chromatic color materials.

11. The data processing apparatus of claim 10, wherein the chromatic color materials for the color printing apparatus include three c of Cyan, Magenta, yellow and the representative color is Yellow.

12. The data processing apparatus of claim 10, wherein the representative color is a color reproduced by using a maximum density of the only one chromatic color.

13. A data processing apparatus which calculates a second color control value which corresponds to a color reproduction of a second color printing apparatus which reproduces a color by a combination of a black plate and a plurality of chromatic color materials, based on a color profile of a first color printing apparatus which reproduces a color by a combination of a black plate and a plurality of chromatic color materials, a color profile of the second color printing apparatus, and a first color control value which corresponds to a color reproduction of the first color printing apparatus, in order to reproduce, at the second color printing apparatus, color which is reproduced at the first color printing apparatus, the color processing apparatus comprising a controller which:
    calculates, based on the color profile of the second color printing apparatus, a characteristic data representing characteristic changes of a brightness and a color saturation of a representative color caused by adding the black plate used at the second color printing apparatus, to the representative color which is reproduced by only any one of the chromatic color materials or a combination of the chromatic color materials used at the second color printing apparatus; and
    calculates the second color control value based on the characteristic data.

14. The data processing apparatus of claim 13, wherein the representative color is a color reproduced by using only one chromatic color material of the plurality of chromatic color materials.

15. The data processing apparatus of claim 14, wherein the chromatic color materials for the color printing apparatus include three colors of Cyan, Magenta, Yellow and the representative color is Yellow.

16. The data processing apparatus of claim 14, wherein the representative color is a color reproduced by using a maximum density of the only one chromatic color.

17. A non-transitory computer-readable storage medium stored therein a program executing a computer to calculate color control values including a quantity of addition of the black plate to a first color reproduced by only a combination of the chromatic color materials to reproduce a second color which is reproduced by adding the black plate to the first color for a color printing apparatus which reproduces a color by combination of a black plate and a plurality of chromatic color materials, the program allowing the computer to function as a controller which:
  calculate, based on a color profile of the color printing apparatus, a characteristic data representing characteristic changes of a brightness and a color saturation of a representative color caused by adding the black plate to the representative color, wherein the representative color is reproduced by only any one of the chromatic color materials or a combination of the chromatic color materials; and
  calculate the color control value based on the characteristic data.

18. The non-transitory computer-readable storage medium of claim 17, wherein the representative color is a color reproduced by using only one chromatic color material of the plurality of chromatic color materials.

19. The non-transitory computer-readable storage medium of claim wherein the chromatic color materials for the color printing apparatus include three colors of Cyan, Magenta, Yellow and the representative color is Yellow.

20. The non-transitory computer-readable storage medium of claim 18, wherein the representative color is color reproduced by using a maximum density of the only one chromatic color.

21. A non-transitory computer-readable storage medium stored therein a program executing a computer to calculate a second color control value which corresponds to a color reproduction of a second color printing apparatus which reproduces a color by a combination of a black plate and a plurality of chromatic color materials, based on a color profile of a first color printing apparatus which reproduces a color by a combination of a black plate and a plurality of chromatic color materials, a color profile of the second color printing apparatus, and a first color control value which corresponds to a color reproduction of the first color printing apparatus, in order to reproduce, at the second color printing apparatus, color which is reproduced at the first color printing apparatus, the program allowing the computer to function as a controller which:
  calculates, based on the color profile of the second color printing apparatus, a characteristic data representing characteristic changes of a brightness and a color saturation of a representative color caused by adding the black plate used at the se color printing apparatus, to the representative color which is reproduced by only any one the chromatic color materials or a combination of the chromatic color materials used at the second color printing apparatus; and
  calculates the second color control value based on the characteristic data.

22. The non-transitory computer-readable storage medium of claim 21, wherein the representative color is a color reproduced by using only one chromatic color material of the plurality of chromatic color materials.

23. The non-transitory computer-readable storage medium of claim 22, wherein the chromatic color materials for the color printing apparatus include three colors of Cyan, Magenta, Yellow and the representative color is Yellow.

24. The non-transitory computer-readable storage medium of claim 22, wherein the representative color is a color reproduced by using a maximum density of the only one chromatic color.

* * * * *